UNITED STATES PATENT OFFICE.

MARTIN EKENBERG, OF STOCKHOLM, SWEDEN.

SOLIDIFIED PETROLEUM AND PROCESS OF PRODUCING SAME.

SPECIFICATION forming part of Letters Patent No. 620,899, dated March 14, 1899.

Application filed August 15, 1896. Serial No. 602,871. (No specimens.)

*To all whom it may concern:*

Be it known that I, MARTIN EKENBERG, a subject of the King of Sweden and Norway, residing at Stockholm, Sweden, have invented certain new and useful Improvements in Solidifying Petroleum, (for which a patent has been granted in France, No. 253,856, dated February 11, 1896, and in Great Britain, No. 16,541, dated July 25, 1896,) of which the following is a specification.

This invention relates to an improved method of manufacturing solidified petroleum in order to obtain an anhydrous, transparent, and homogeneous product.

Hitherto, so far as I am aware, solidifications of petroleum or distillates of petroleum have been produced either by mixing with the same insoluble porous substances or other substances, as resin, caoutchouc, gutta-percha, cerisin, and solid fats or soaps of glycerin-fat, and fat-oils containing glycerin. If soaps of glycerin-fat have been added, the mixture always contains, necessarily, a certain amount of physically-combined water. If not, the soaps will after a certain time separate. Especially will this be the case when distillates of a high boiling-point are used. Wool-fat has been used for the said purpose, but only in emulsion with water and with an addition of common salt, this latter substance being employed to make the mixture thicker or of the consistency of a paste. It is in this case to be noticed that the wool-fat in such mixture will serve alone by its mass as a thickening agent without being saponified, that free acids which possibly might be present in the wool-fat having previously been carefully washed away or neutralized. The product thus obtained will be aqueous, is not transparent, and will be easily altered by changes of temperature.

According to this invention an anhydrous homogeneous transparent solidification of petroleum or the distillates thereof is obtained by dissolving therein fatty acids from wool-fat and heating the solution to from 120° to 200° centigrade, and then adding hydrates of alkali, as potash or soda, or alkaline earths, as lime, magnesia, and the like. During the addition of the hydrates the temperature must not be below 120° centigrade, and in that case the solidification obtained will be anhydrous. The wool-fat acids should not contain any glycerin-fat or such fatty acids as will be found in glycerin-fat, as by mixing in such substances an inferior product will be obtained. The amount of said fatty acids obtained from wool-fat that have to be added will vary between one per cent. to fifteen per cent. or more, depending upon the degree of consistency it is desired the product should have. The quantity of hydrates to be added should be such that at least half the quantity of the fatty acids will be neutralized.

It will be understood from the above that the characteristic feature of this invention is that the fatty acids obtained from wool-fat and freed from other fatty acids found in other substances, such as glycerin-fat, are added to the petroleum or the distillate of petroleum, while these acids have in prior-known processes not been required, and therefore carefully removed. It has been hitherto unknown that the soaps of the said fatty acids in wool-fat may at an elevated temperature be dissolved in petroleum or distillates of petroleum and that such a solution after cooling will be solidified and not undergo any alteration.

In order to solidify distillates of low boiling-point, previously-produced anhydrous soaps of wool-fat acids and hydrates of alkali or alkaline earths are dissolved therein.

Solidified substances manufactured according to the above-described process may be used as lubricants, as a protecting agent against rust, and for other purposes.

The product obtained according to this invention differs from such produced in accordance with prior processes therein in that it is entirely free from water and contains soaps of wool-fat acids, which, as far as known, are unlike ordinary fatty acids in that they are oxyacids.

The fatty acids referred to above may be separated from wool-fat in the following manner: Raw wool-fat or lanolin is saponified in a closed vessel at a temperature of from 200° to 300° centigrade, together with a strong lye of anhydrous potash. To this mixture is added an acid (as sulfuric acid) and water, during which operation the fatty acids separate.

Having thus described my invention, I claim—

1. The herein-described method of treating petroleum and its distillates to effect the solidification thereof, which consists in dissolving in the same, under the influence of heat, a soap of the fatty acids of wool-fat and then cooling the mass, substantially as set forth.

2. The herein-described method of solidifying petroleum and its distillates, which consists in dissolving therein a fatty acid from wool-fat, then heating the solution, and then, while the solution is hot, adding thereto an alkaline hydrate or earth to produce a soap of the fatty acid, substantially as and for the purpose set forth.

3. The herein-described method of solidifying petroleum and its distillates, which consists in dissolving therein a fatty acid from wool-fat free from fatty acids found in glycerin-fat in substantially the proportion specified, then heating the solution up to from 120° to 200° centigrade, then adding to the solution the hydrate of an alkali in substantially the proportions specified, and then cooling, whereby the mass becomes solid.

4. As a new article of manufacture, a solid, anhydrous, homogeneous, transparent substance consisting of petroleum, or petroleum distillate and the soaps of a fatty acid of wool-fat, substantially as described.

It witness whereof I have hereunto signed my name in the presence of two subscribing witnesses.

MARTIN EKENBERG.

Witnesses:
   CARL P. GERELL,
   CARL TH. SUNDHOLM.